United States Patent [19]

Nakajima et al.

[11] 3,945,727

[45] Mar. 23, 1976

[54] PHOTOGRAPHIC PRINTING AND PROCESSING APPARATUS

[75] Inventors: Yasutaka Nakajima, Neyagawa; Toshiharu Sasaki, Kawanishi; Noboru Katakabe, Katano, all of Japan

[73] Assignee: Matsushita Electric Industrial Co., Ltd. - Wireless Research Laboratory, Osaka, Japan

[22] Filed: Aug. 13, 1974

[21] Appl. No.: 497,132

[30] Foreign Application Priority Data

Aug. 14, 1973 Japan................................ 48-91129

[52] U.S. Cl..................................... 355/27; 355/10
[51] Int. Cl.².................... G03B 27/32; G03B 27/52
[58] Field of Search............................. 355/3, 10, 27

[56] References Cited
UNITED STATES PATENTS
3,697,173  10/1972   Sasaki et al........................... 355/27

*Primary Examiner*—Richard A. Wintercorn
*Attorney, Agent, or Firm*—Wenderoth, Lind & Ponack

[57] ABSTRACT

A photographic apparatus for producing a visible image on a photosensitive unit including a photosensitive film mounted on a film mount. The apparatus includes: a first member having a supplying station, an exposure station, a developing station and a fixing station provided on a principal surface thereof; two transfer means, one for transferring the unit from the supplying station to the exposure station and or for transferring the unit from the exposure station to the developing station, and from the developing station to the fixing station; and driving means for driving the two transfer means. A latent image of an original is formed on the film at the exposure station, the latent image is developed at the developing station, and the developed image is fixed at the fixing station. The feature of this apparatus is that the function of holding the unit and guiding it to each of said stations is achieved by the first member, and independently the function of transferring the unit is achieved by the two transfer means, whereby the transfer of the unit from one station to another can be carried out securely without fail, and the mechanism of the apparatus can be simplified.

9 Claims, 21 Drawing Figures

PHOTOGRAPHIC PRINTING AND PROCESSING APPARATUS

This invention relates to a photographic apparatus for producing a visible image of any original on a photosensitive unit including a photosensitive film mounted thereon, and particularly to a photographic apparatus capable of exposing, developing and fixing a photosensitive film mounted on a mount in a short time.

In recent years, so-called slides (lantern slides or transparencies) have been used widely in the field of education, various meetings, etc. Conventionally, a roll of film is exposed to images of many originals so as to produce many latent images thereon, and is developed and fixed in a dark room to produce many visible images thereon. Then, the thus treated roll of film is cut into a plurality of single sheets of film, each of which is finally mounted on a film mount separately. Accordingly, not only is a troublesome and time consuming operation necessary in the dark room, but the inconvenience of cutting and mounting of the finished film is also inevitable. Furthermore, the employed roll of film has a predetermined length which causes a waste of film when only a few originals are to be photographed.

U.S. Pat. No. 3,697,173 shows a photographic apparatus which overcomes the disadvantages of the conventional technique as set forth above. This invention is an improvement over U.S. Pat. No. 3,697,173. Disadvantages of the photographic apparatus of U.S. Pat. No. 3,697,173 are that the transfer of the photosensitive unit from one station (supplying station, exposure station or developing station) to another station (exposure station, developing station or fixing station) is not always carried out securely, and the mechanism of the apparatus is not sufficiently simple.

Accordingly, an object of this invention is to provide a photographic apparatus for easily and quickly producing a slide having a visible image on a photosensitive film in a photosensitive unit thereof.

It is a further object of this invention to provide a photographic apparatus including an improved construction for transferring a photosensitive unit.

These objects are achieved according to this invention by providing a photographic apparatus comprising: a first member having a supplying station, an exposure station, a developing station and a fixing station provided on a principal surface thereof; a supplying means for supplying a photosensitive unit having a photosensitive film to the supplying station; a first transfer means for transferring the photosensitive unit from the supplying station to the exposure station at which the photosensitive film is exposed to an image of an original so as to form a latent image of the original on the photosensitive film; second transfer means for transferring the photosensitive unit from the exposure station to the developing station at which the exposed photosensitive film is developed so as to produce a visible image of the original on the photosensitive film, the first transfer means also transferring the photosensitive unit from the developing station to the fixing station at which the developed photosensitive film is fixed so as to produce a visible permanent image on the photosensitive film; and driving means for driving the first and second transfer means.

The basic difference between U.S. Pat. No. 3,697,173 and this invention can be briefly explained as follows. According to this invention, the supplying station, the exposure station, the developing station and the fixing station are all integrally provided on one member (first member), and the first member is made to have the functions of holding and guiding the photosensitive unit to each station. The function of transferring the photosensitive unit from one station to another is achieved by the two (first and second) transfer means. On the other hand, according to U.S. Pat. No. 3,697,173, a unit holder of a first transfer means has the functions of holding and transferring a photosensitive unit, and at the same time, the unit holder per se is a developing station and a fixing station.

Other objects and details of this invention will be apparent from the following description taken together with the accompanying drawings, in which.

While a preferred embodiment of this invention is described herein, it is contemplated that considerable variation may be made in the method of operation and the construction of parts without departing from the spirit of this invention.

In the following description and claims, parts will be identified by specific names for convenience, but they are intended to be generic in their application to similar parts as the art will permit.

Figure 1:
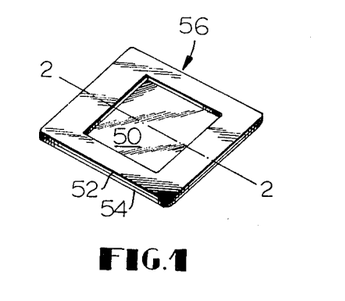
FIG. 1 is a perspective view of a photosensitive unit which can be used in one embodiment of the photographic apparatus of this invention.
Figures 2, 3:
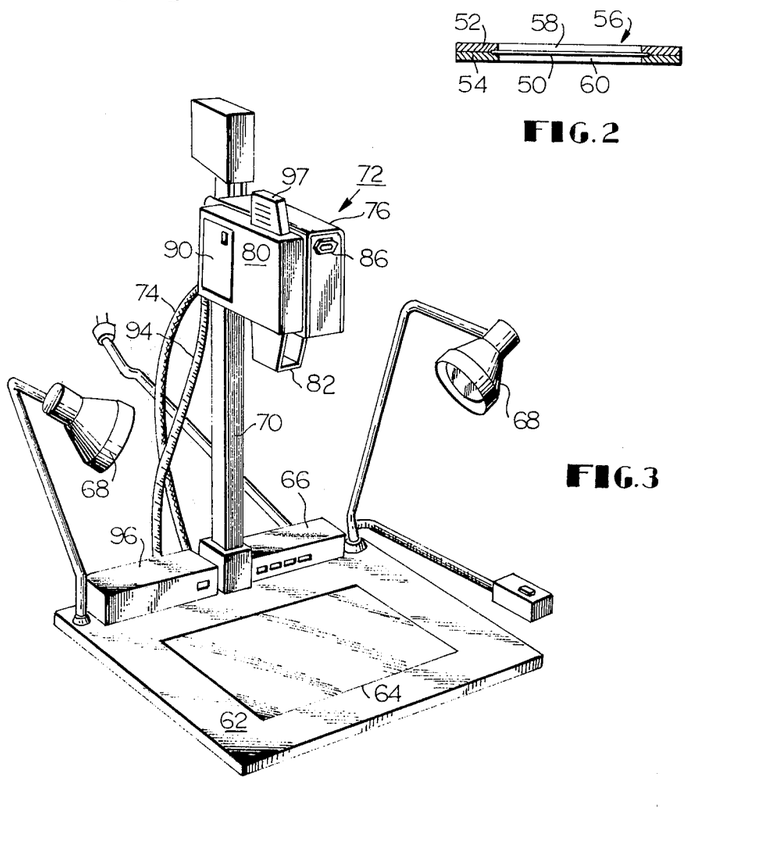
FIG. 2 is a cross-sectional view of the photosensitive unit of FIG. 1 taken along the 2—2 line.
FIG. 3 is a perspective view of an apparatus including one embodiment of the photographic apparatus of this invention.

FIGS. 1 and 2 show a photosensitive unit which can be used in the photographic apparatus of this invention. Referring to FIGS. 1 and 2, reference numeral 56 designates a photosensitive unit having a transparent film 50 mounted between a first mount 52 and a second mount 54. The transparent film 50 may be a kind of silver film for slide use or a transparent electrophotosensitive film, of a kind which is described in U.S. Pat. No. 3,697,173. The outer dimensions of the first mount 52 and the second mount 54 can be determined arbitrarily but a preferable size is the same as that of a conventional slide mount such as 2 by 2 inches because this makes possible easy projection of finished photosensitive units by a conventional slide projector. The first mount 52 has a first aperture 58 formed at the photosensitive side of the film 50, and the second mount 54 has a second aperture 60 through which a finished image on the film 50 is projected.

Figure 4:
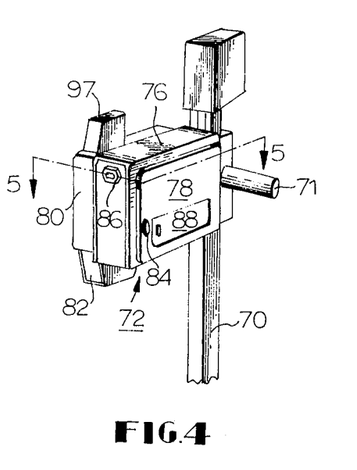
FIG. 4 is a perspective view of one portion of the apparatus of FIG. 3 seen from an opposite side.

FIGS. 3 and 4 show an apparatus including one embodiment of the photographic apparatus of this invention. Referring to FIGS. 3 and 4, reference numerals 62 and 64 designate a base and a plate, respectively, for an original (not shown). There are a control box 66, a pair of light sources 68 and a column 70 fixed to the base 62. Reference numeral 72 designates a camera assembly 72 which is mounted on and reciprocally movable along the column 70. The control box 66 includes a power switch, several pilot lamps and electrical circuit parts for controlling the apparatus. The camera assembly 72 is coupled to the control box 66 by an electrical cord 74 and is electrically controlled by operating the control box 66. The camera assembly has a camera case 76, a right side panel 78, a left side panel 80, an outlet 82 for ejecting finished photosensitive units having visible permanent images on the films thereof, a locking knob 71 for fixing the camera assembly 72 in an arbitrary position along the column 70 and also for releasing it, a focusing knob 84 and a finder 86 for focusing and trimming. The right side panel 78 has an inlet 88 for supplying photosensitive units therethrough and a cover plate for the inlet 88. The left side panel 80 has an inlet 90 for supplying therethrough processing liquids to be used for developing and fixing latent images formed on the films of photosensitive units. There is also provided a cover plate for the inlet 90. The left side panel 80 further has a fan motor portion 97 thereon which includes a fan motor therein for supplying a flow of air to the surface of the film of a photosensitive film wet with the processing liquids so as to dry the surface of the film. On the base 62 is provided a drain receptacle 96 to which used processing liquids are drained through a drain hose 94.

FIGS. 5, 6, 7 and 8 are schematic central sectional views of the apparatus taken along the lines 5—5, 6—6, 7—7 and 8—8, respectively, and show general internal construction of the camera assembly 72. Referring to FIGS. 5, 6, 7 and 8, there are provided a first member 98, a second member 100, a driving means 102, a unit supplying means 104 and a processing liquid supplying means 106. The first member 98 has an opening 108 for holding and supplying photosensitive units 56. Thus, the opening 108 can be called a supplying station 108. The first member has provided thereon an exposure station 110 at which the film of a photosensitive unit is exposed to an image of an original by means of lights from the light sources 68 and an exposure means 126 described later, a developing station 112 at which the exposed film is developed with the aid of a processing (developing) liquid and a fixing station 114 at which the developed film is fixed with the aid of a processing (fixing) liquid. These four stations 108, 110, 112 and 114 are on a principle plane (surface) 115 of the first member 98. Further, the first member 98 has longitudinal guiding steps 116, 117, 118 and 119 and cross guiding steps 120 and 121.

Figures 7, 9:
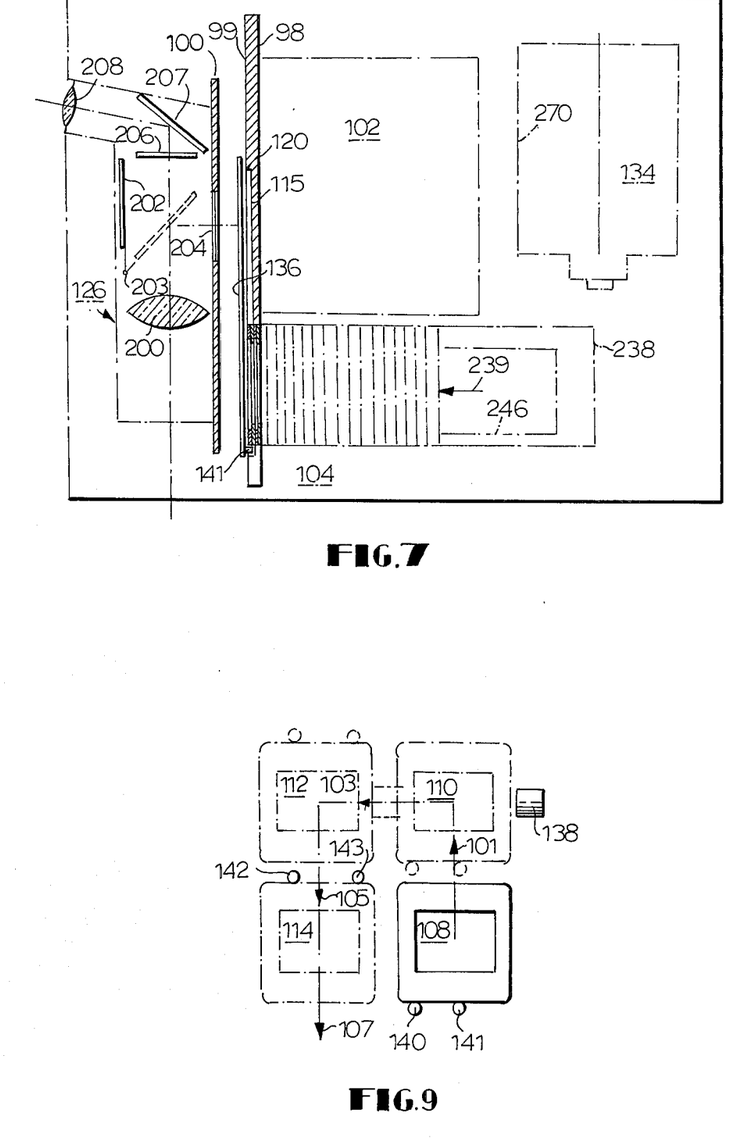
FIG. 7 is a schematic central sectional view of the apparatus as shown in FIG. 6 taken along the line 7—7 of FIG. 6.
FIG. 9 is a schematic explanatory view showing the sequence of transferring the photosensitive unit.
Figure 8:
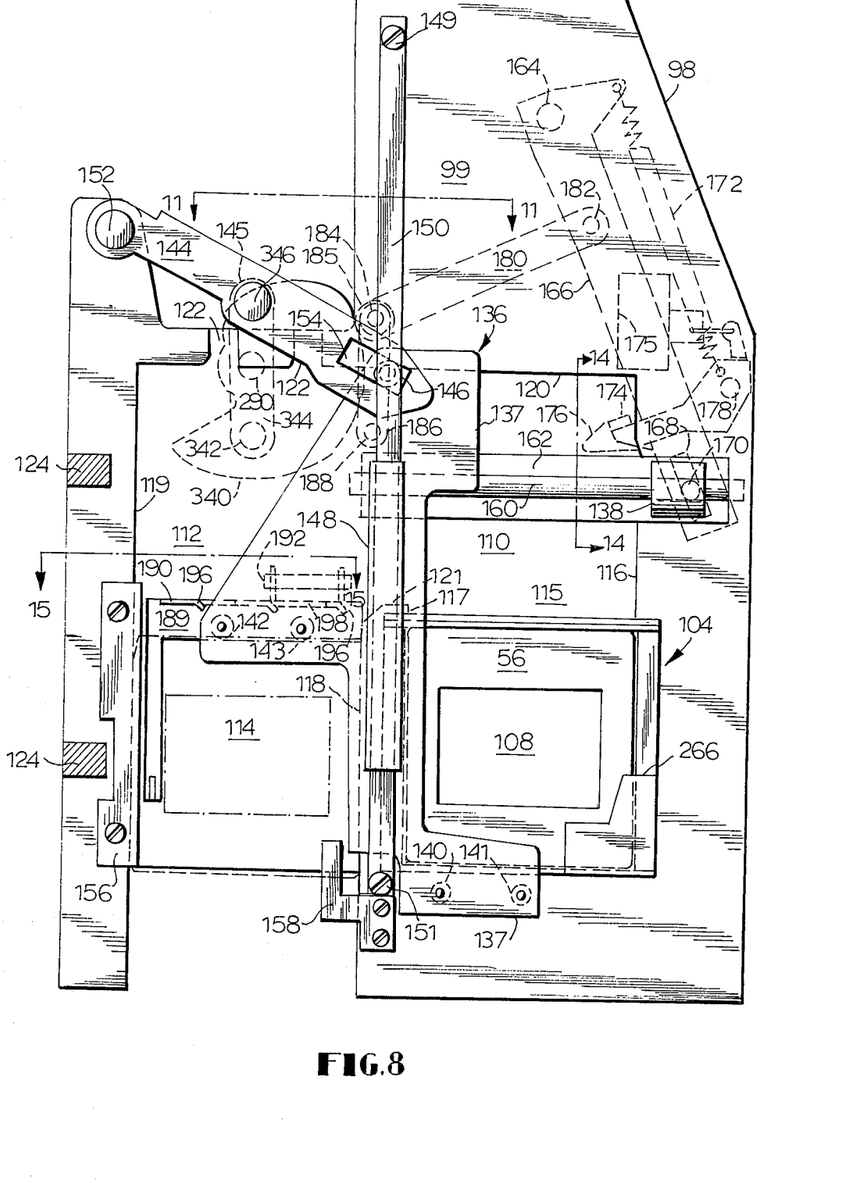
FIG. 8 is a schematic central sectional view of the apparatus as shown in FIG. 5 taken along the line 8—8 of FIG. 5.

FIG. 9 is a schematic explanatory view and the sequence of transferring photosensitive units. Referring to FIG. 9 and FIG. 8, a photosensitive unit 56 supplied at the supplying station 108 is transferred to the exposure station 110 from the supplying station 108 under the guidance of the longitudinal guiding step 116 and 117 as indicated by an arrow 101. Upon completion of exposure, the photosensitive unit having the exposed film is transferred from the exposure station 110 to the developing station 112 under the guidance of the cross guiding steps 120 and 121 as indicated by an arrow 103. Upon completion of development of the film, the photosensitive unit with the developed film is transferred to the fixing station 114 from the developing station 112 under the guidance of the longitudinal guiding steps 118 and 119 as indicated by an arrow 105. After the film is fixed with the aid of a fixing liquid, the photosensitive unit with the fixed film is kicked out to the outlet 82 as indicated by an arrow 107.

Figure 5:
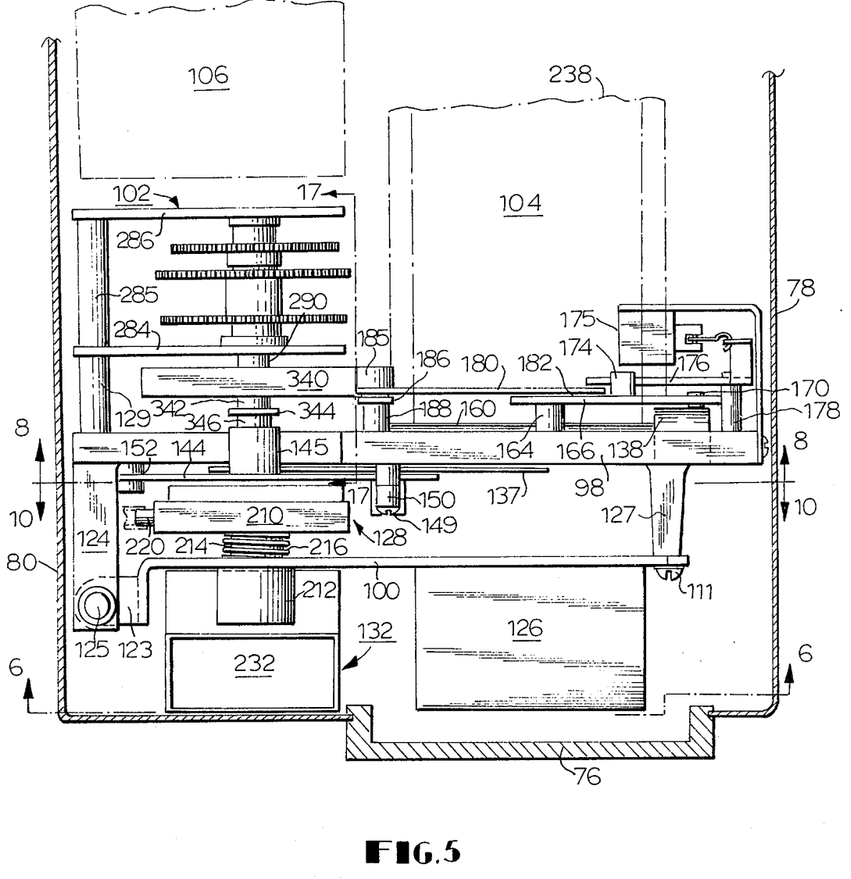
FIG. 5 is an enlarged schematic central sectional view of the apparatus of FIG. 4 taken along the line 5—5 in FIG. 4.
Figure 6:
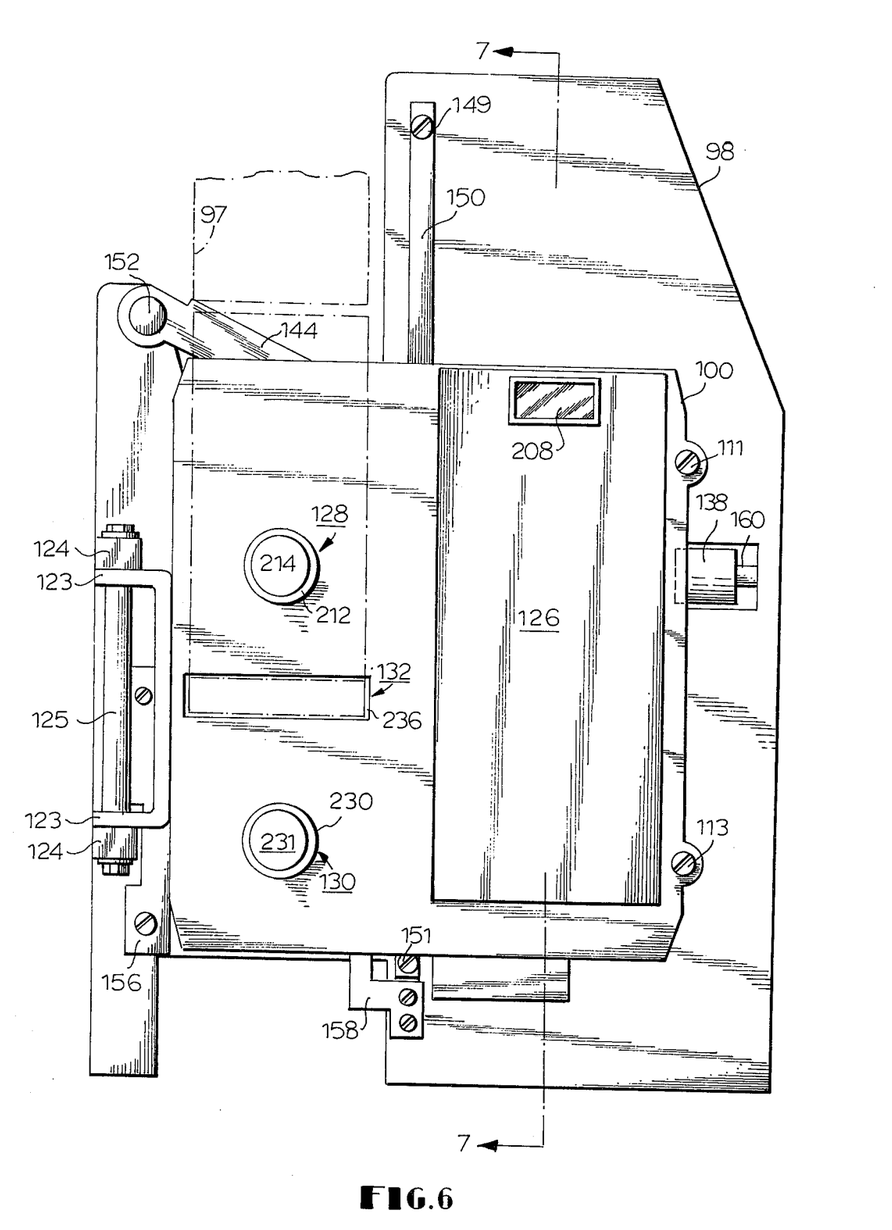
FIG. 6 is a schematic elevational view of the apparatus as shown in FIG. 5 taken along the line 6—6 in FIG. 5.
Figure 10:
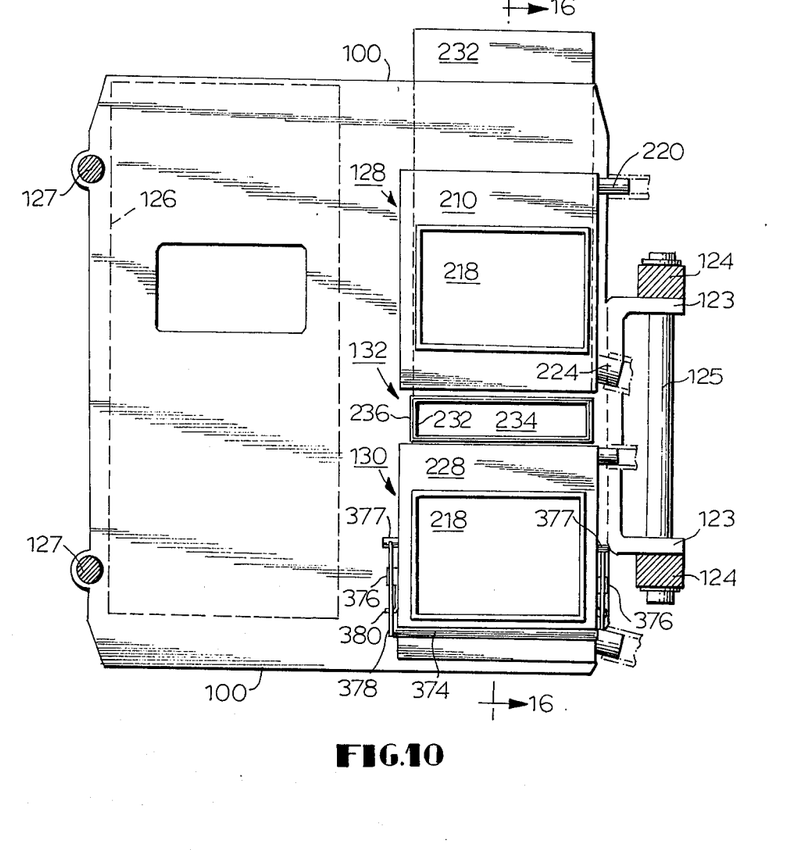
FIG. 10 is a schematic central sectional view of the apparatus as shown in FIG. 5 taken along the line 10—10 of FIG. 5.

FIG. 10 is a schematic central sectional view of the apparatus of FIG. 5 taken along the line 10—10. As shown in FIGS. 5, 6 and 10, the second member 100 has two bent ear portions 123 at one end thereof and is pivotally mounted by the ear portions 123 on a shaft 125 which is fixed to a pair of brackets 124 provided on the first member 98. The second member 100 is further fastened by screws 111 and 113 at the other end thereof to stays 127 provided on the first member 98. Furthermore, the second member 100 is provided with the exposure means 126, a developing means 128, a drying means 132 and a fixing means 130. The exposure means 126, the developing means 128 and the fixing means 130 face the exposure station 110, the developing station 112 and the fixing station 114, respectively. As shown in FIGS. 5 and 7, the driving means 102 is attached to the first member 98 by staybolts 129 (one of which is shown in FIG. 5), and is coupled to the unit transfer means, the exposure means 126, the developing means 128 and the fixing means 130. As shown in FIGS. 5, 7 and 8, the unit supplying means 104 is disposed at the supplying station 108, and fundamentally comprises a cartridge unit 238 having a stop 266 and a pushing member 246 slidably mounted therein. The cartridge unit 238 contains photosensitive units 56 and is loaded at the supplying station 108 through the inlet 88. Details of the mechanism for loading the cartridge unit 238 is not shown. A foremost photosensitive unit 56 is transferred to the exposure station 110 from the supplying station 108 by pins 140 and 141 of the first transfer means described later, and the remaining photosensitive units move by the thickness of one photosensitive unit in the direction of an arrow 239 (FIG. 7) with the aid of the pushing member 246 at every transfer of a photosensitive unit 56. The processing liquid supplying means 106 is outlined in FIG. 5. The processing liquid supplying means 106 is disposed behind the driving means 102 and supplies processing liquids from a tank means 134 (FIG. 7) to the developing means 128 including a developing chamber 210 and the fixing means 130 including a fixing chamber 228 (FIG. 10).

In the following, details of the first member 98, the second member 100 and the driving means 102 will be descibed.

First Member 98

As described above, the first member 98 is provided with the supplying station 108, the exposure station 110, the developing station 112 and the fixing station 114 in the principle plane (surface) 115 thereof, and has the guiding steps 116, 117, 118 and 119 and the cross guiding steps 120 and 121. These steps are slightly larger in thickness than the photosensitive unit 56. Therefore, a foremost surface 99 of the first member 98 and the principal plane 115 are spaced from each other a distance substantially equal to the thickness of the photosensitive unit 56 and are parallel to each other. An the first member 98 are provided a first transfer means 136 for transferring the photosensitive unit 56 in a longitudinal direction a second transfer means 138 for transferring the photosensitive unit 56 in a cross direction, and a guiding member 190 disposed at a position between the developing station 112 and the fixing station 114.

Figure 11:
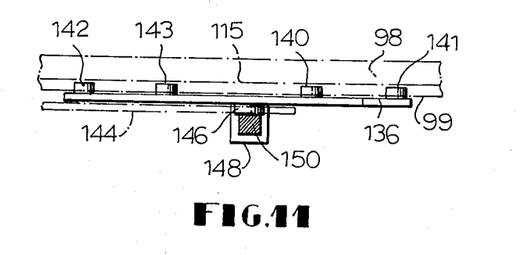
FIG. 11 is a schematic central sectional view of the apparatus as shown in FIG. 8 taken along the line 11—11 of FIG. 8 for explaining the first transfer means.

FIG. 11 is a schematic central sectional view of the apparatus of FIG. 8 taken along the line 11—11 and is presented mainly for explaining the first transfer means. As shown in FIGS. 8 and 11, the first transfer means 136 comprises a carriage plate 137 and a first driving lever 144. The carriage plate 137 has pins 140 and 141 for transferring the photosensitive unit 56 from the supplying station 108 to the exposure station 110, and also has pins 142 and 143 for transferring the photosensitive unit 56 from the developing station 112 to the fixing station 114. Further, the carriage plate 137 has a roller pin 146 at an upper portion thereof and a slider 148 slidably supported on a square guide rod 150 fixed to the first member 98 by screws 149 and 151. The first driving lever 144 is pivotally mounted on a shaft 152 fixed to the first member 98 and is engaged with the roller pin 146 of the first transfer means 136 via a square opening 154 thereof. Thus, a counterclockwise movement of the first driving lever 144 in FIG. 8 imparts a straight longitudinal movement to the carriage plate 137 in an upward direction along the guide rod 150.

Figure 12:
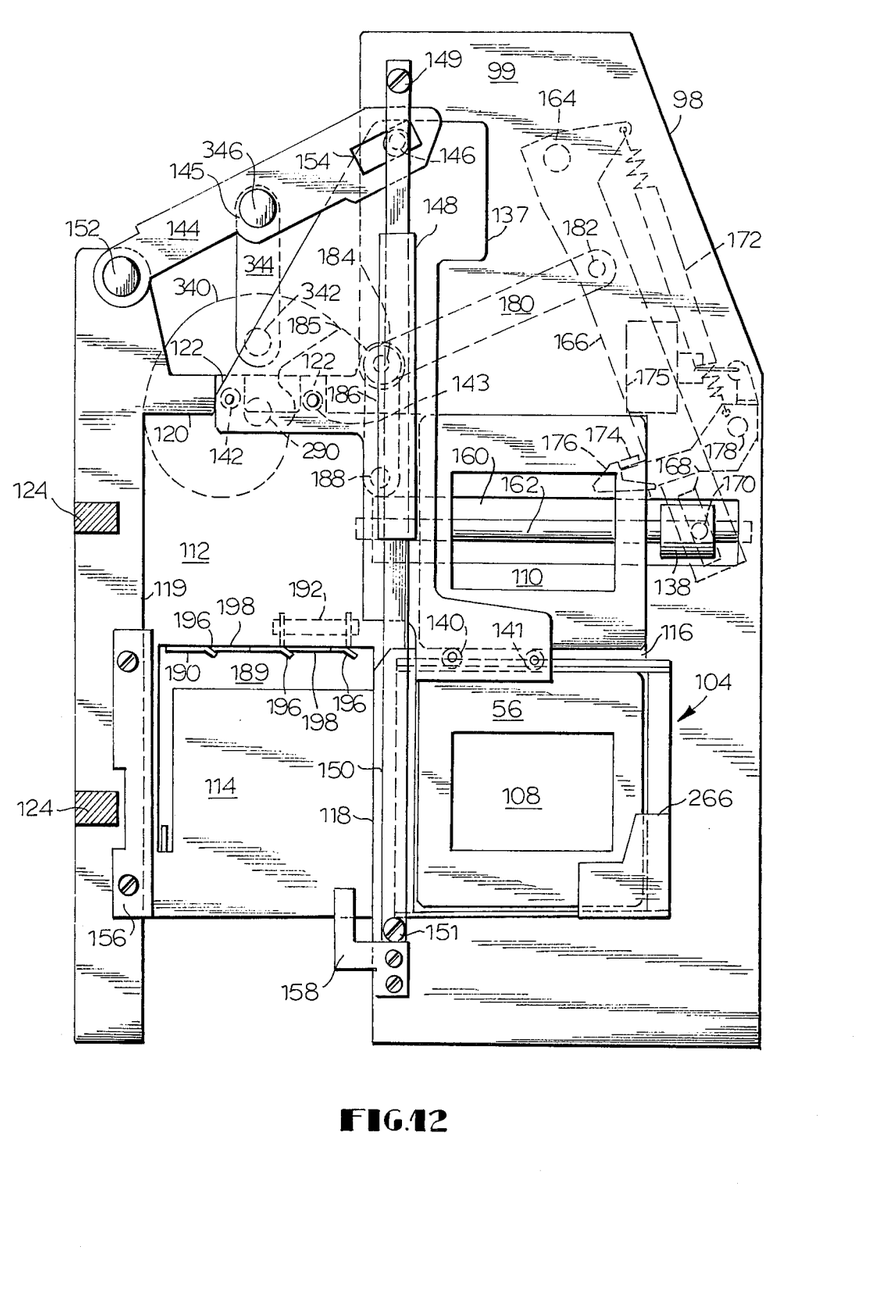
FIG. 12 is a schematic central sectional view similar to FIG. 8 for explaining the transfer of the photosensitive unit, in wich the photosensitive unit is positioned at the exposure station.

FIG. 12 is a schematic central sectional view of the apparatus of to FIG. 8 and is presented mainly for explaining the transfer along the photosensitive unit. Cutouts 122 of the cross guiding steps 120 in the first member 98 serve to permit passage beyond the cross guiding steps 120 of the pins 142 and 143 when the carriage plate 137 moves in an upward direction as shown in FIG. 12. The carriage plate 137 is reciprocally movable in a plane parallel to and spaced from the principal plane 115 of the first member 98 at a distance slightly larger than the thickness of the photosensitive unit 56 under the guidance of the guide rod 150.

Figure 13:
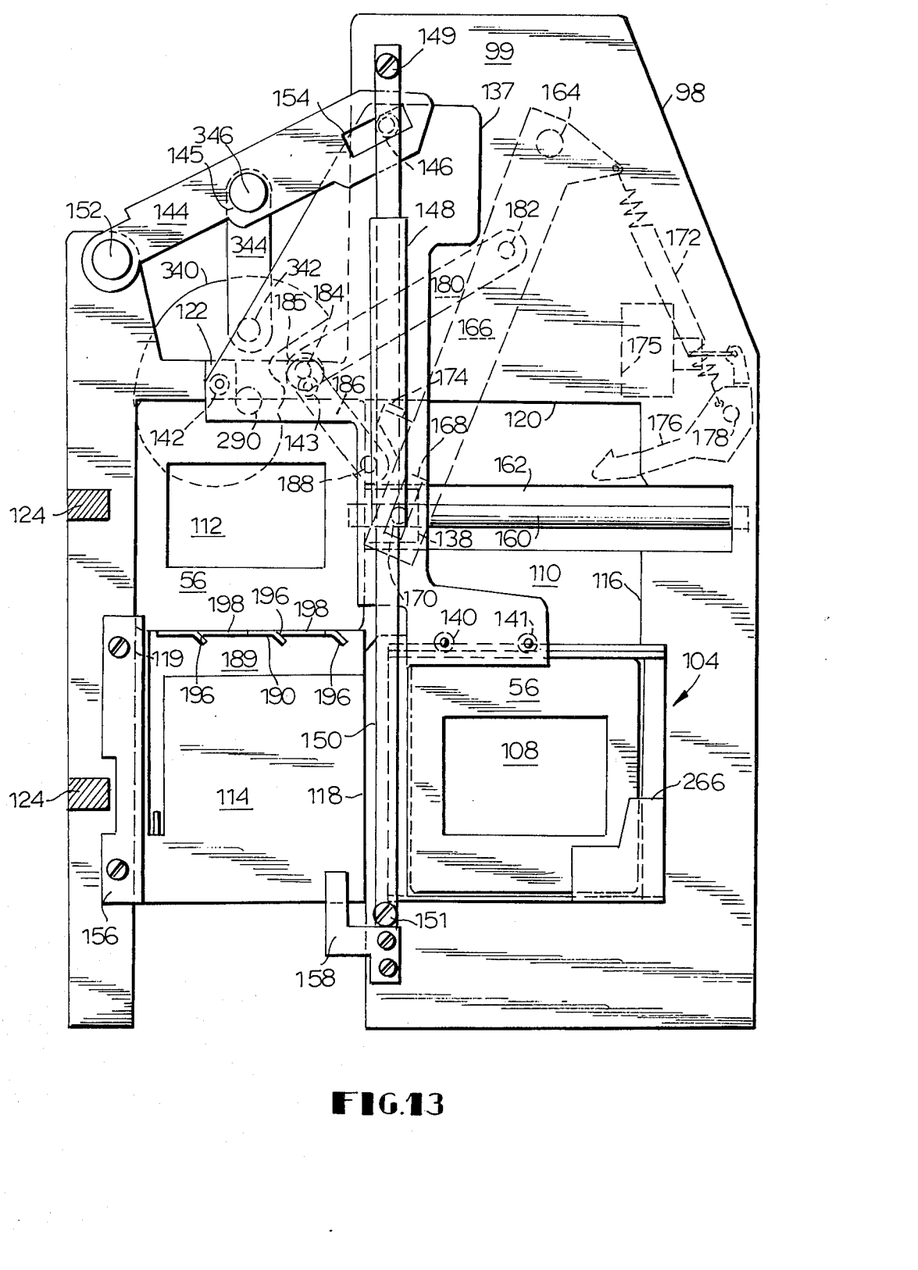
FIG. 13 is a schematic central sectional view similar to FIG. 8 for explaining the transfer of the photosensitive unit, in which the photosensitive unit is positioned at the developing station.

FIG. 13 is also a schematic central sectional view of the apparatus similar to FIG. 8 or FIG. 12, and is presented mainly for explaining the transfer of the photosensitive unit. As shown in FIGS. 8, 12 and 13, the carriage plate 137 is shaped in a manner such that some portions of the carriage plate 137 always overlap the face of the photosensitive unit 56 in sectional views such as those of FIGS. 8, 12 and 13 in order to hold the photosensitive unit 56 by and between the overlapping portions of the carriage plate 137 and the principal plane 115 of the first member 98. At the fixing station 114 of the first member 98 are fastened keeper plates 156 and 158 which serve to hold the photosensitive unit 56 in a space formed between the keeper plates 156 and 158 and the principal plane 115 at the fixing station 114 when the carriage plate 137 moves in an upward direction and is positioned at an upper position as shown in FIG. 12 for subjecting a subsequent photosensitive unit to exposure.

Figure 14:
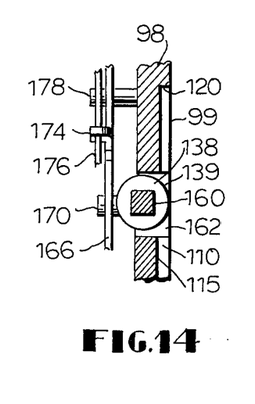
FIG. 14 is a schematic central sectional view of the apparatus as shown in FIG. 8 taken along the line 14—14 of FIG. 8.

FIG. 14 is a schematic central sectional view of the apparatus of FIG. 8 taken along the line 14-14. As shown in FIGS. 8 and 14, the second transfer means 138 is behind the first member 98 and comprises a kicker 139, a square bar 160 fixed to the first member 98 and disposed in an opening 162 of the first member 98, a second driving lever 166, a latch lever 176, a first link 180 and a second link 186. The kicker 139 is slidably mounted on the square bar 160 and is provided with a pin 170. The second driving lever 166 is pivotably mounted on a shaft 164 fixed to the first member 98 and is engaged with the pin 170 of the kicker 139 via an opening 168 provided at one end portion thereof. The latch lever 176 is pivotably mounted on a shaft 178 fixed to the first member 98 and is connected to a solenoid 175 fastened to the first member 98. The solenoid 175 is energized upon completion of the exposure process for the film of the photosensitive unit 56. Between the second driving lever 166 and the latch lever 176 is tensioned a spring 172 which serves to urge the second driving lever 166 and the latch lever 176, but such rotations are restricted by the abutment of the latch lever 176 clockwise in FIG. 8 on a bent portion 174 of the second driving lever 166. When such rotation restriction is removed, the second driving lever 166 is forced to rotate clockwise by the force of the spring 172 and causes the kicker 139 to move to the left as shown in FIG. 13. Consequently, the photosensitive unit 56 is transferred to the developing station 112 from the exposure station 110, and the kicker 139 passes just behind the carriage plate 137. The first link 180 is pivotably mounted on the second driving lever 166 by a pin 182 provided at one end portion thereof, and is also pivotably connected at the other end portion thereof on to the second link 186 by a pin 184 which is fixed to one end portion of the second link 186 and which holds a cam roller 185 thereon. The second link 186 is pivotably mounted on an axis 188 fixed to the first member 98. Accordingly, a clockwise rotation of the second driving lever 166 imparts a counterclockwise rotation to the second link 186 in association with the first link 180 as shown in FIG. 13. In FIG. 13, when the second link 186 is forced to rotate counterclockwise by the driving means 102 described later in detail, the second driving lever 166 is rotated counterclockwise in association with the first link 180 against the spring 172, and is consequently engaged with the latch lever 176. As a result, the kicker 138 is returned to its initial position.

Figure 15:
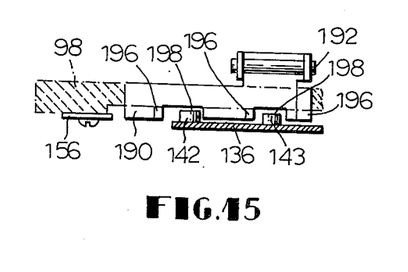
FIG. 15 is a schematic central sectional view of the apparatus as shown in FIG. 8 taken along the line 15—15 of FIG. 8.
Figure 16:
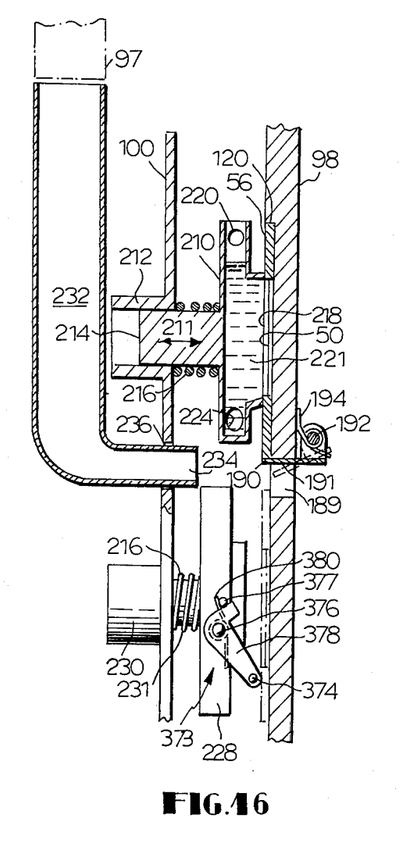
FIG. 16 is a schematic central sectional view of the apparatus as shown in FIG. 10 taken along the line 16—16 of FIG. 10 with cross-sections of the developing and the fixing stations added thereto for explaining the developing operation.

FIG. 15 is a schematic central sectional view of the apparatus of FIG. 8 taken along the line 15—15, and FIG. 16 is a schematic central sectional view of the apparatus of FIG. 10 taken along the line 16—16 with cross-sections of the developing and the fixing stations added thereto and is presented mainly for explaining developing operations. The guiding member 190 is disposed in an opening 189 of the first member 98 as shown in FIG. 8, and is rotatably mounted on a shaft 192 fixed to the first member 98 as detailedly shown in FIGS. 15 and 16. This guiding member 190 is biased to rotate clockwise by a torsion spring 194 with reference to FIG. 16, but such clockwise rotation is restricted by the abutment of the guiding member 190 on the upper side 191 of the opening 189. The guiding member 190 has sloped portions 196 to serve to make smooth and sure movement of the photosensitive unit 56 from the exposure station 110 to the developing station 112. The guiding member 190 further has cutouts 198 for passage of the pins 142 and 143 of the carriage plate 137 on the guiding member 190. When the photosensitive unit 56 is transferred from the developing station 112 to the fixing station 114 upon completion of the development operation, the photosensitive unit 56 forces the guiding member 190 to rotate counterclockwise against the torsion spring 194 as shown by broken lines in FIG. 16, and the photosensitive unit 56 passes over the guiding member 190. Upon arrival of the photosensitive unit 56 at the fixing station 114, the guiding member 190 is released from its abutment with the photosensitive unit 56 and is restored to its initial position by the torsion spring 194.

Second Member 100

As described above, the second member 100 is provided with the exposure means 126, the developing means 128, the fixing means 130 and the drying means 132, and is pivotably mounted on the axis 125 supported on the first member 98. When the second member 100 is rotated around the shaft 125 clockwise with reference to FIG. 5, the four means 126, 128, 130 and 132 of the second member 100 swing away from the first member 98. That is, it can be considered that the second member 100 is then practically removed from the first member 98. The advantage of such structure gives that it is easy access to the first member 98 when some trouble such as jamming of the transfer of photosensitive units happen in the first member 98. The exposure means 126 as schematically shown, as an example, in FIG. 7 comprises a lens 200, a first mirror 202 rotatably mounted on a shaft 203, a shutter assembly 204, a focusing plate 206, a second mirror 207 and a finder lens 208. Light reflected from an original is focused on the focusing plate 206 by the lens 200. Thus, an image is formed on the focusing plate 206. The image on the focusing plate 206 is reflected by the second mirror 207 to the finder lens 208, and can be observed through the finder 86 for focusing and trimming the original. Upon arrival of the photosensitive unit 56 at the exposure station 110, the first mirror 202 rotates clockwise around the axis 203 as shown by broken lines in FIG. 7 so that the film of the photosensitive unit 56 is exposed to the image of the original. At the end of this exposure process, the first mirror 202 returns to its initial position.

As shown in FIGS. 10 and 16, the developing means 128 comprises a developing chamber 210 and a developing actuating means for actuating the developing chamber 210. Similarly, the fixing means 130 comprises a fixing chamber 228 and a fixing actuating means for actuating the fixing chamber 228. The developing chamber 210 and the fixing chamber 228 have substantially the same construction, and both can be called a processing chamber. Therefore, the construction of the developing chamber 210 will be described in detail in the following. As shown in FIGS. 10 and 16, the developing chamber 210 has an opening 218 formed at one side thereof, a liquid inlet 220 for introducing the developing liquid 221 from the developer supplying tank 270 (FIG. 7) to the developing chamber 210, a liquid outlet 224 for exhausting the developing liquid 221 after the development process, and a conducting rod 214 fixed thereto. As shown in FIG. 16, the opening 218 is facing the principal plane of the photosensitive unit 56 and has a size which is slightly larger than the first aperture 58 of the photosensitive unit 56. The conducting rod 214 is slidably movable in the direction of the arrow 211 under the guidance of a conducting member 212 which is integrally formed with the second member 100. Accordingly, the developing chamber 210 is movable in a direction vertical to the principal plane of the photosensitive unit 56. The developing chamber 210 is biased toward the photosensitive unit 56 so as to cause the opening 218 to engage with the photosensitive unit 56 by a compression spring 216 which is positioned between the developing chamber 210 and the second member 100. However, the developing chamber 210 is normally retracted to a position which is out of the path of the photosensitive unit 26 when the developing means 128 is not in action. Upon arrival of the photosensitive unit 56 at the developing station 112, the developing chamber 210 press-fits the opening 218 against the surface of the photosensitive unit 56 as shown in FIG. 16, and forms a developing space in association with the surface of the photosensitive unit 56. A predetermined amount of the developing liquid 221 is introduced from the liquid inlet 220 into the developing space so that the developing liquid remains in the developing space for a predetermined time period so as to develop the surface of the film of the photosensitive unit which has been subjected to the exposure process as described above. The developing liquid 221 is subsequently exhausted from the developing space to the liquid outlet 224. After the development process, the developing chamber 210 disengages from the photosensitive unit 56 against the compression spring 216 so that the photosensitive unit 56 can be transferred to the fixing station 114. At the fixing station 114, the photosensitive unit 56 is fixed by fixing liquid in the fixing chamber 228 which has the same construction as that of the developing chamber 210. A conducting rod 231 and a conducting member 230 (FIGS. 6 and 16) of the fixing chamber 228 correspond to the conducting rod 214 and the conducting member 212, respectively, of the developing chamber 210.

The mechanism for actuating the developing chamber, the fixing chamber, the means for supplying the processing (developing or fixing) liquids, the means for exhausting the processing liquids and the means for keeping the processing liquids at the processing space are not shown, because such mechanism can be constructed in conventional ways as e.g. shown in detail in U.S. Pat. No. 3,697,173. For purposes of this application, it is sufficient to say that the driving force of a second gear 296 of the driving means 102 is used for development and the driving force of a second shaft 292 of the driving means 102 is used for fixation as described later. As shown in FIG. 10 and 16, the fixing chamber 228 is provided with a wiping means 373 which consists of a pair of levers 378 pivotably mounted on shafts 376 fixed to the fixing chamber 228, a wiping roller 374 rotatably mounted on the pair of levers 378 and a pair of torsion springs 380. The pair of levers 378 are biased to rotate counterclockwise by the torsion springs 380, but such rotation is normally restricted by a pair of pins 377 fixed to the fixing chamber 228. As the photosensitive unit 56 is transferred from the developing station 112 to the fixing station 114, the wiping roller 374 comes in contact with the surface of first mount 52 of the photosensitive unit 56 and wipes off any undried developing liquid which may remain on the surface of the first mount 52. The drying means 132 (FIGS. 5 and 16) comprises a fan motor 97 and a duct 232 for guiding the air from the fan motor 97 to the space between the developing chamber 210 and the fixing chamber 228. The duct 232 is fixed to the second member 100, and a blowing outlet 234 of the duct 232 is disposed in an opening 236 of the second member 100. While the photosensitive unit 56 is being transferred from the developing station 112 to the fixing station 114, the fan motor 97 is energized and the air conducted through the duct 232 dries the surface of the photosensitive unit 56.

Driving Means

The driving means 102 drives the first transfer means 136, the second transfer means 138, the exposure means 126, the developing means 128 and the fixing means 130, and actuates the drying means 132 in response to the actuation of an electrical switch (not shown).

Figure 17:
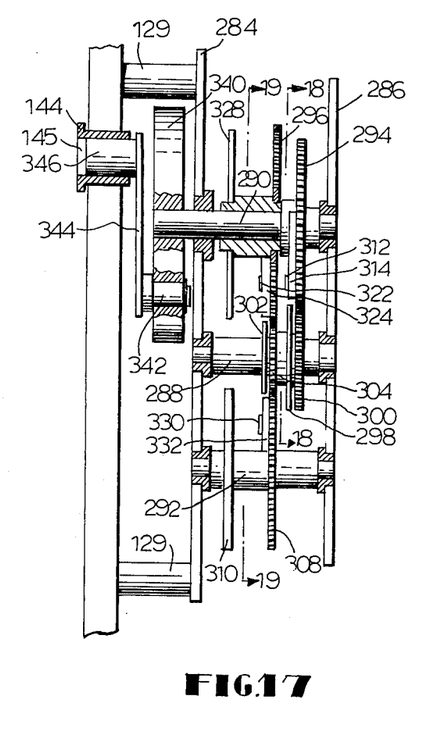
FIG. 17 is a schematic central sectional view of the apparatus as shown in FIG. 5 taken along the line 17—17 of FIG. 5 for showing the main mechanism of the driving means.

FIG. 17 is a schematic central sectional view of the apparatus of FIG. 5 taken along the line 17—17 and illustrates the main mechanism of the driving means 102. As shown in FIGS. 5 and 17, the driving means 102 fundamentally comprises a first plate 284, a second plate 286, a main shaft 288 rotatably mounted on the first and the second plates 284 and 286, a first shaft 290, a second shaft 292 and a driving motor (not shown) for driving the main shaft 288. The first plate 284 and the second plate 286 are connected by stay-bolts 285, and the first plate 284 is attached to the first member 98 by stay-bolts 129. The main shaft 288 is continuously rotated by the motor, and has thereon a first two-toothed wheel 298, a first gear 300, a second two-toothed wheel 302 and a second gear 304. These wheels 298 and 302 and the gears 300 and 304 are fixed to the main shaft 288. The first shaft 290 has thereon a third gear 294 fixed thereto, a fourth gear 296 rotatably supported thereby and a transfer cam 340 attached thereto. The second shaft 292 has a fifth gear 308 and a fixing cam 310 attached thereto for driving the fixing means 130. The first two-toothed wheel 298 has two teeth 333 and 334, and the second nail wheel 302 has two nails 335 and 336.

Figure 18:
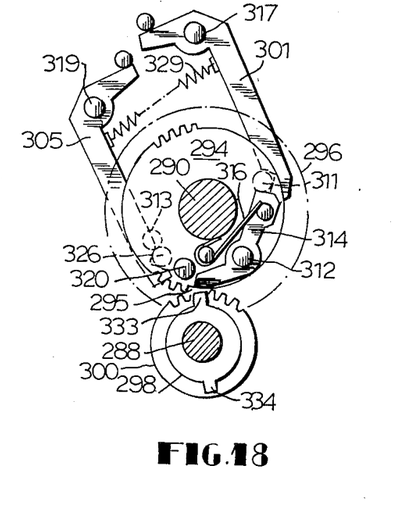
FIG. 18 is a schematic central sectional view of the apparatus as shown in FIG. 17 taken along the line 18—18 in FIG. 17.

FIG. 18 is a schematic central sectional view of the apparatus of FIG. 17 taken along the line 18—18. As shown in FIG. 18, the third gear 294 has a first clutch lever 314 pivotably mounted thereon by a pin 312, a torsion spring 316 for biasing the first clutch lever 314 clockwise, a pin 320 mounted thereon and detent pins 311 and 313 mounted thereon. Just half number of the teeth of the third gear 294 are cut out. The first clutch lever 314 is actuated by a starting mechanism 350 described later to rotate counterclockwise against the torsion spring 316.

Figure 19:
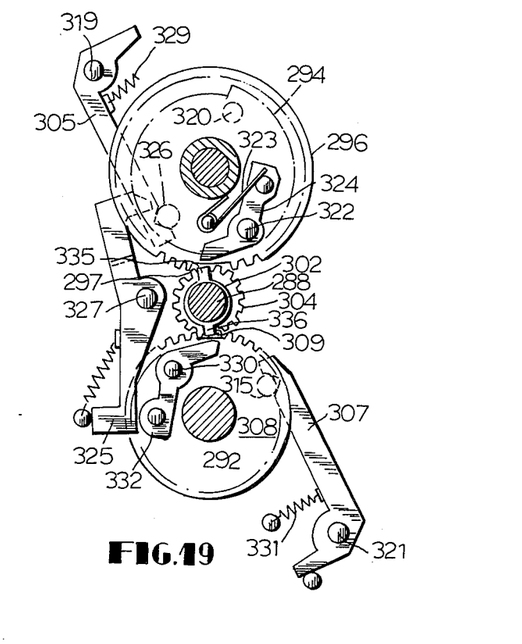
FIG. 19 is a schematic central sectional view of the apparatus as shown in FIG. 17 taken along the line 19—19 of FIG. 17.

FIG. 19 is a schematic central sectional view of the apparatus of FIG. 17 taken along the line 19—19. As shown in FIG. 19, the fourth gear 296 has a cut-out portion 297, a second clutch lever 324 pivotably mounted thereon by a pin 322, a torsion spring 323 for biasing the second clutch lever 324 clockwise, and a driving pin 326 fixed to the back thereof. Normally the driving pin 326 is in contact with the pin 320 of the third gear 294 (FIG. 18). The second clutch lever 324 is actuated, by the movement of the second driving lever 166, to rotate counterclockwise against the torsion spring 323 when the photosensitive unit 56 is transferred to the developing station 112. The fourth gear 296 is further provided with a developing cam 328 for actuating the developing means 128. The mechanism for actuating the developing means 128 by means of the developing cam 328 is conventional as shown e.g. in U.S. Pat. No. 3,697,173. The mechanism for actuating the fixing means 130 by means of the fixing cam 310 is similar to that for the developing means 128. As shown in FIGS. 5 and 17, the transfer cam 340 is disposed at a position between the first member 98 and the first plate 284 and fixed to the first shaft 290. Referring to FIGS. 8 and 17, the transfer cam 340 carries a shaft 342 rotatably mounted thereon which is fixed to a crank arm 344. The crank arm 344 has a pin 346 at one end thereof. The pin 346 is rotatably held by a sleeve 145 fixedly mounted on the first driving lever 144. Accordingly, the rotation of the transfer cam 340 imparts a reciprocal swinging movement to the first driving lever 144 around the shaft 152 in association with the crank arm 344. On the other hand, the transfer cam 340 is shaped as shown in FIG. 8 in a manner such that the transfer cam 340 actuates the second link 186 by engagement with the cam roller 185.

The fifth gear 308 has a cut-out portion 309, a detent pin 315 fixed thereto and a third clutch lever 332 pivotably and frictionally mounted thereon by means of a pin 330. The third clutch lever 332 is actuated, by a clutch member 325 pivotably mounted on the second plate 286 by means of a pin 327, to rotate counterclockwise when the rotation of the fourth gear 296 comes to an end. The third gear 294 is adapted to be in meshing engagement with the first gear 300. The fourth gear 296 and the fifth gear 308 are adapted to be in meshing engagement with the second gear 304. Normally, these three gears 294, 296 and 308 do not rotate and are stationary because of the existance of the cut-out portions 295, 297 and 309 while the main shaft 288 is rotating. This stationary state of these three gears 294, 296 and 308 is ensured by a first detent lever 301, a second detent lever 305 and a third detent lever 307 in association with the pins 311, 326 and 315, respectively. These three detent levers 301, 305 and 307 are the same in shape and are rotatably mounted on pins 317, 319 and 321, respectively, which are fixed to the second plate 286. Further, the first detent lever 301 and the second detent lever 305 are biased by a spring 329, and the third detent lever 307 is also biased by a spring 331 in order to ensure the stationary state of the three gears 294, 296 and 308.

Figure 20:
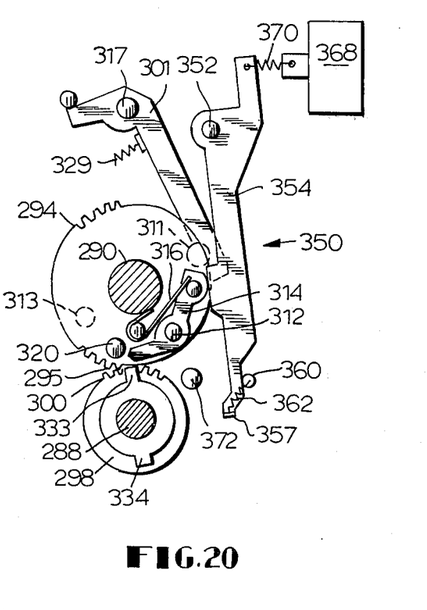
FIGS. 20 and 21 are schematic central sectional views similar to FIG. 18 for explaining a starting mechanism for starting the driving of the driving means.
Figure 21:
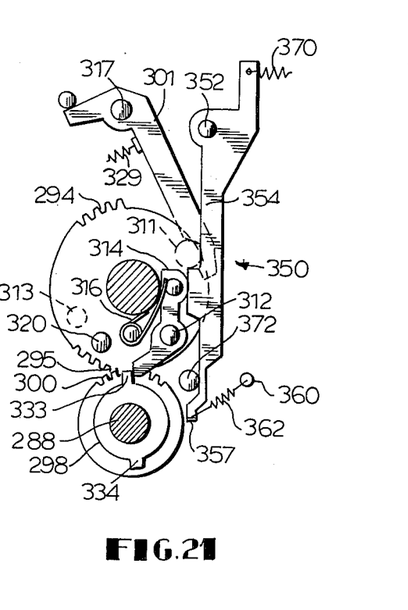

FIGS. 20 and 21 are schematic central sectional views of the apparatus of FIG. 18 and are presented for explaining the starting mechanism 350 for starting the rotation of the driving means (third gear 294). Referring to FIGS. 20 and 21, the starting mechanism 350 comprises a start lever 354 pivotably mounted on a pin 352 fixed to the second plate 286, and a start solenoid 368 attached to the second plate 286. The start lever 354 is connected with the solenoid 368 by means of a tension spring 370 at an upper end portion thereof. A tension spring 362 is tensioned between a pin 360 fixed to the second plate 286 and a bent portion 357 of the start lever 354 and biases the start lever 354 in a counterclockwise direction. A pin 372 beside the pin 360 is attached to the second plate 286 and serves as a stop for stopping the start lever 354.

The following description explains the whole movement of the apparatus of this invention.

Upon energization of the start solenoid 368, the start lever 354 is rotated from an initial position as shown in FIG. 20 to a second position as shown in FIG. 21 around the pin 352 against the spring 362 so that the start lever 354 engages with the first clutch lever 314. Accordingly, the first clutch lever 314 rotates around the pin 312 against the torsion spring 316 and brings an end portion thereof into engagement with one of the teeth 333 and 334 of the first two-toothed wheel 298 as shown in FIG. 21. This engagement initiates the rotation of the third gear 294 and brings the third gear 294 into meshing engagement with the first gear 300 in order to rotate the first shaft 290. The first shaft 290 continues a first rotation until the cut-out portion of the third gear 294 arrives at the meshing point between the third gear 294 and the first gear 300. That is, the first shaft 290 finishes the first rotation after its rotation through 180°. The first detent lever 301 ensures the stationary state of the first shaft 290 in association with the detent pin 313 of the third gear 294. During the first rotation of the first shaft 290, the fourth gear 296 is in its stationary state, and the second detent lever 305 ensures the stationary state of the fourth gear 296 at its initial position.

By the first rotation of the first shaft 290, the transfer cam 340 counterclockwise through rotates an angle of 180° with reference to FIG. 8, and the first driving lever 144 is rotated counterclockwise by the crank arm 344 as shown in FIG. 12. Accordingly, the carriage plate 137 is moved so as to transfer the photosensitive unit 56 from the supplying station 108 to the exposure station 110 in association with the pins 140 and 141. Upon arrival of the photosensitive unit 56 at the exposure station 110, the first mirror 202 occupies the position as shown by the broken lines in FIG. 7 so as to project the image of the original onto the photosensitive unit 56 through the shutter assembly 204. During the exposure, the pins 140 and 141 cause the photosensitive unit 56 to remain at the exposure station 110 so as to prevent the photosensitive unit 56 from moving in a way that might result in damage of the image. On the other hand, the transfer cam 340 occupies the position as shown in FIG. 12 so that the cam roller 185 of the second link 186 is free from its engagement with the transfer cam 340, and is ready to rotate counterclockwise.

Upon completion of the exposure, the solenoid 175 is energized so that the latch lever 176 rotates counterclockwise with reference to FIG. 12, and the latch lever 176 is disengaged from the second driving lever 166. Consequently, the second driving lever 166 rotates clockwise quickly under the bias of the spring 172, and transfers the photosensitive unit 56 from the exposure station 110 to the developing station 112 in association with the kicker 139 as shown in FIG. 13. The guiding member 190 just below the developing station 112 guides the photosensitive unit 56 to the developing station 112 and causes the photosensitive unit 56 to remain at the developing station 112.

When the photosensitive unit 56 arrives at the developing station 112, the second clutch lever 324 of the fourth gear 296 is rotated around the pin 322 against the torsion spring 323 in association with the movement of the second driving lever 166, and brings one end portion thereof into engagement with one of the teeth 335 and 336 of the second two-toothed wheel 302. This engagement causes the fourth gear 296 to rotate slightly and come into meshing engagement with the second gear 304 so that the fourth gear 296 is continuously rotated through an angle of 360°.

While the fourth gear 296 rotates through an angle of 180° to (i.e. from 0° to 180°), the developing cam 328 actuates the developing means 128 and finishes the operation of the developing means 128.

Just when the fourth gear 296 reaches the rotational angle of 180°, the driving pin 326 of the fourth gear 296 abuts the pin 320 of the third gear 294 which has completed the first rotation through 180° described above. During the subsequent rotation of the fourth gear 296 through another angle of 180° (i.e. from 180° to 360°), the driving pin 326 pushes the pin 320 so that the third gear 296 rotates in a second rotation thereof until the cut-out portion 297 of the fourth gear 296 arrives at the meshing point between the fourth gear 296 and the second gear 304. When the cut-out portion 297 arrives at the meshing point, each of the fourth gear 296, the third gear 294 and the first shaft 290 finishes a full rotation, respectively, and occupies the initial position thereof, respectively.

According to the second rotation of the third gear 294 and the first shaft 290, the transfer cam 340 also rotates in a second rotation thereof. The first driving lever 144 rotates clockwise in association with the crank arm 344. Consequently, the carriage plate 137 carries out a second movement so as to transfer the photosensitive unit 56 from the developing station 112 to the fixing station 114 in association with the pins 142 and 143. On the other hand, during the second rotation of the transfer cam 340, the transfer cam 340 engages with and pushes the cam roller 185 of the second link 186, and rotates the second link 186 clockwise so that the second driving lever 166 is returned to its initial position in association with the link 180 and is finally engaged with the latch lever 176.

While the photosensitive unit 56 is being transferred from the developing station 112 to the fixing station 114, the dryer fan motor is energized for blowing air onto the photosensitive unit 56 through the duct 232 in order to dry the photosensitive unit 56.

As soon as the photosensitive unit 56 starts to move to the fixing station under the pushing force of the pins 142 and 143, the guiding member 190 is forcedly rotated to a position as shown by the broken lines in FIG. 16 by the photosensitive unit 56 against the torsion spring 194. Upon completion of the transfer of the photosensitive unit 56 to the fixing station 114, the guiding member 190 is returned to the initial position by the torsion spring 194.

At the end of the rotation of the fourth gear 296, the driving pin 326 abuts and rotates the clutch member 325 clockwise around the pin 327 with reference to FIG. 19. The clutch member 325 rotates the third clutch lever 332 of the fifth gear 308 around the pin 330 and brings the clutch lever 332 into engagement with one of the teeth 395 and 396 of the second two-toothed wheel 302. This engagement initiates the rotation of the fifth gear 308 and brings the fifth gear 308 into meshing engagement with the second gear 304 in order to rotate the second shaft 292 counterclockwise with reference to FIG. 19. During the rotation of the second shaft 292, the fixing cam 310 actuates the fixing means 130 for fixing the latent image formed on the film of the photosensitive unit 56 at the developing process. At the end of the rotation of the second shaft 292, the photosensitive unit 56 having been subjected to all the necessary processes is kicked out from the fixing station 114 to the outlet 82 by means of the fixing cam 310. Briefly summarizing with respect to the second shaft 292, the second shaft 292 is intermittently engageable with said main shaft 288 so as to drive said fixing means.

When the photosensitive unit 56 is transferred from the developing station 112 to the fixing station 114 and when the photosensitive unit 56 is kicked out from the fixing station 114, the surface of the first mount 52 of the unit 56 is in contact with the wiping roller 374. The wiping roller 374 serves to maintain the photosensitive unit 56 at the fixing station 114 in association with the torsion spring 380 under the frictional engagement thereof with the photosensitive unit 56. Furthermore, the wiping roller 374 serves to wipe away possible undried developing liquid remaining on the surface of the first mount 52 of the photosensitive unit 56.

When the photosensitive unit 56 arrives at the fixing station 114, the carriage plate 137 is ready to move upwardly so as to transfer a subsequent photosensitive unit from the unit supplying station 108 to the exposure station 110. Therefore, it is possible to subject such subsequent photosensitive unit to an exposure process while the preceding photosensitive unit 56 is being fixed at the fixing station 114.

What is claimed is:

1. A photographic apparatus for producing a visible permanent image on a photosensitive film in a photosensitive unit which comprises a film mount and said photosensitive film mounted on said film mount, said photographic apparatus including:
    a first member having a supplying station, an exposure station, a developing station and a fixing station provided along a path on a principal surface thereof, said photosensitive unit being supplied to said supplying station;
    driving means;
    first transfer means operatively coupled to and driven by said driving means and reciprocally movable thereby in a plane parallel to and spaced from said principal surface of said first member at a distance slightly larger than the thickness of said photosensitive unit for transferring said photosensitive unit along said principal surface from said supplying stataion to said exposure station by a first movement thereof;
    exposure means operatively coupled to and driven by said driving means for subjecting said photosensitive film of said of photosensitive unit at said exposure station to a light reflected from an original from which said visible permanent image is to be produced, so as to form a latent image of said original on said photosensitive film;
    second transfer means operatively coupled to and driven by said driving means and reciprocally movable thereby between said exposure station and said developing station and for transferring said photosensitive unit along said principal surface from said exposure station to said developing station;
    developing means operatively coupled to and driven by said driving means for developing said latent image at said developing station so as to form a developed image, said first transfer means further transferring said photosensitive unit along said principal surface from said developing station to said fixing station by a second movement thereof; and fixing means operatively coupled to and driven by said driving means for fixing said developed image at said fixing station so as to form said visible permanent image.

2. A photographic apparatus according to claim 1, wherein said first transfer means comprises means in pushing engagement with one of sides of said photosensitive unit in said first movement thereof and in pushing engagement with the other side of said photosensitive unit in said second movement thereof.

3. A photographic apparatus according to claim 1, wherein said first transfer means comprises:
    a carriage plate reciprocally movable in said plane parallel to and spaced from said principal surface of said first member for transferring said photosensitive unit from said supplying station to said exposure station by a first movement thereof, and also from said developing station to said fixing station by a second movement thereof; and
    a driving lever pivotably mounted on said first member and engaged with said carriage plate, said driving lever imparting said reciprocal movement to said carriage plate by a reciprocal swinging movement thereof.

4. A photographic apparatus according to claim 3, wherein said carriage plate has some portions thereof which always overlap said photosensitive unit in order to hold said photosensitive unit by and between the overlapping portions of said carriage plate and said principal surface of said first member.

5. A photographic apparatus according to claim 1, wherein said driving means comprises:
    a main shaft having a first gear and a second gear, and continuously rotating while said apparatus is in action;
    a first shaft having a third gear and a fourth gear, said third gear being fixed to said first shaft and being rotated through an angle from 0° to 180° by its meshing engagement with said first gear whereby said first shaft imparts said first movement to said first transfer means, said fourth gear being rotatably mounted on said first shaft and rotated by its meshing engagement with said second gear, said fourth gear driving said developing means by its rotation through an angle from 0° to 180° and also driving to rotate said third gear by its rotation through another angle from 180° to 360° whereby said first shaft imparts said second movement to said first transfer means and drives said second transfer means; and a second shaft intermittently engageable with said main shaft so as to drive said developing means.

6. A photographic apparatus according to claim 1, which further comprises a second member having said exposure means, said developing means and said fixing means attached thereto, said second member being pivotably mounted on said first member at one end portion thereof and detachably mounted on said first member at the other end thereof.

7. A photographic apparatus according to claim 1, which further comprises a guiding member adjacent said path for guiding said photosensitive unit from said exposure station to said developing station and for causing said photosensitive unit to remain at said developing station during development.

8. A photographic apparatus according to claim 7, wherein said guiding member is pivotably mounted on said first member, whereby said photosensitive unit forcedly rotates said guiding member and moves over said guiding member when said photosensitive unit is transferred from said developing station to said fixing station by said first transfer means.

9. A photographic apparatus according to claim 1, which further comprises wiping means adjacent said path which is in contact with the surface of said photosensitive unit for wiping the surface of said photosensitive unit while said photosensitive unit is being transferred from said developing station to said fixing station.

* * * * *